May 5, 1953 — C. DI VINCENZO — 2,637,474

CARRIER BRACKET FOR TRUCKS

Filed Jan. 3, 1951 — 2 SHEETS—SHEET 1

INVENTOR.
Casey Di Vincenzo
BY Robb & Robb,
Attorneys

May 5, 1953

C. DI VINCENZO 2,637,474

CARRIER BRACKET FOR TRUCKS

Filed Jan. 3, 1951

INVENTOR.
Casey Di Vincenzo
BY Robb & Robb,
Attorneys

Patented May 5, 1953

2,637,474

UNITED STATES PATENT OFFICE 2,637,474

CARRIER BRACKET FOR TRUCKS

Casey Di Vincenzo, East Cleveland, Ohio

Application January 3, 1951, Serial No. 204,253

8 Claims. (Cl. 224—42.45)

1

This invention relates to a novel carrier bracket unit particularly suited for use with trucks or other vehicles, where additional means for carrying long pieces of material are desired to be provided.

At the present time the latest models of trucks are so designed that the body portions thereof are substantially in alignment with the fenders, whereby the fenders do not extend beyond the confines of the body. This construction has resulted in the design of the particularly novel carrier bracket unit of this invention. This invention provides for employment of the particular carrier bracket unit on trucks, as described, whereby portions of the units normally extend outwardly beyond the fenders or fender, as the case may be, for supporting thereon long lengths of pipe or the like, and after removal of these pieces of material, the portions may be folded into positions where the same will not extend beyond the body or fender substantially, whereby to create a hazard in use.

It is therefore an object of this invention to provide a novel carrier bracket unit comprised of simple parts, easily manufactured, which may be mounted in any one of a number of positions to carry out its purpose of supporting a long load of material.

It is a further object of this invention to provide a carrier bracket unit which may be folded out of the way when it is not in use, novel means being incorporated which maintain the device in folded and in extended positions.

It is a further object of this invention to provide carrier bracket units of the class described in which the peculiar novel mounting thereof provides an additional function when long loads are being carried thereon, viz., that of locking the material to prevent undue shifting of the same, whereby the load might become displaced from its position upon the units.

It is a still further object of this invention to provide novel mounting means for the carrier bracket units which may be used therewith for mounting the same in a plurality of positions, not limited by the various contours upon which the mounting is to be effected.

Other and further objects of this invention will be apparent from the description of the same and its manner of use, together with a consideration of the drawings in which.

2 another method of mounting the invention, together with the necessary supporting and bracing means therefor.

Figure 3:
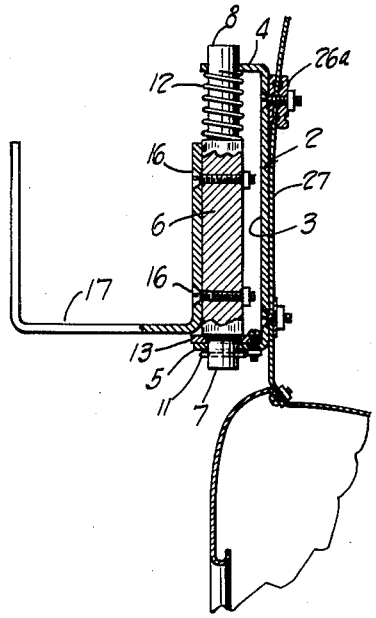

Figure 3 discloses still another mounting arrangement for the bracket unit of this invention.

Figure 4:
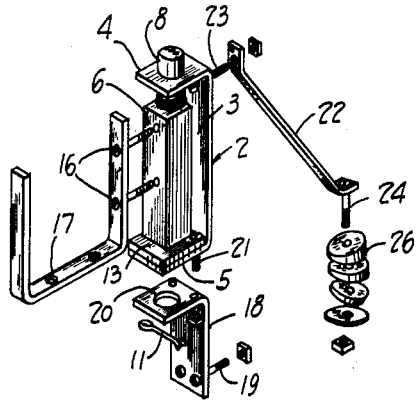

Figure 4 is a perspective view of the invention and the manner in which present forms of brackets may be associated therewith, the view being exploded to show the relationship of the various parts.

Figure 5:
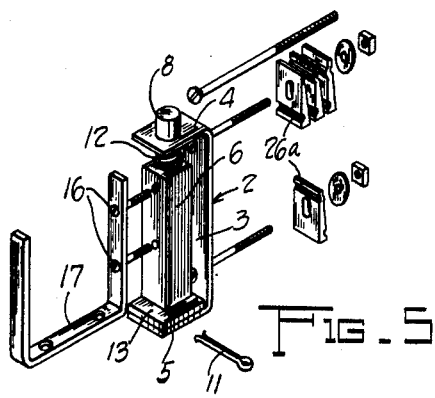

Figure 5 is a perspective view like Figure 4 showing other mounting devices for the unit.

Figure 6:
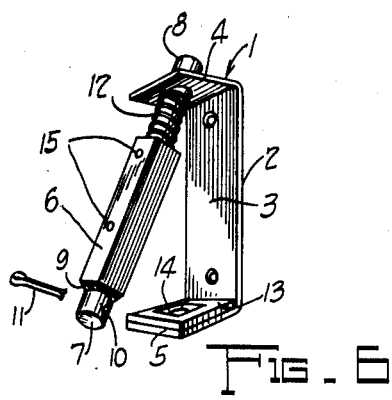

Figure 6 is a perspective view of the unit with a portion thereof shown in its partially assembled position.

Figure 7:
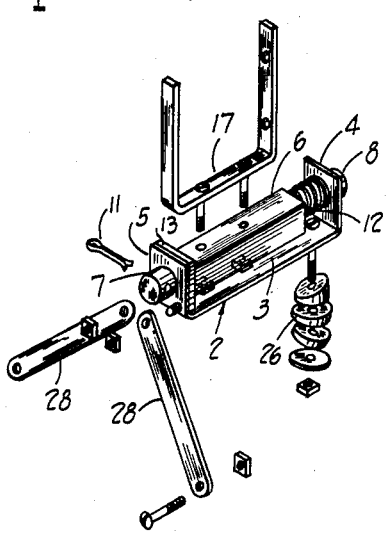

Figure 7 is a view similar to Figures 4 and 5, being a perspective view and showing various mounting and bracing means in their relationship, the view being an exploded view.

Figure 8:
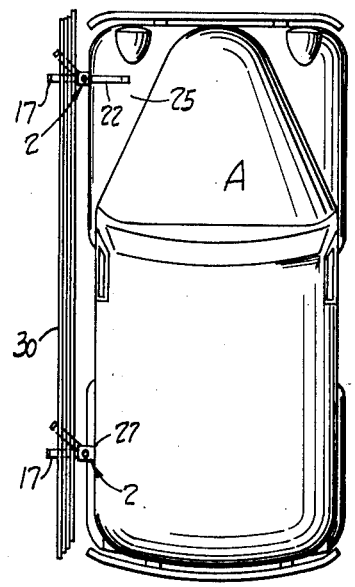

Figure 8 is a top plan view, somewhat diagrammatic, illustrating a truck with the unit mounted thereon in two positions, and disclosing the same as being loaded with long pipes or the like.

Figure 1:
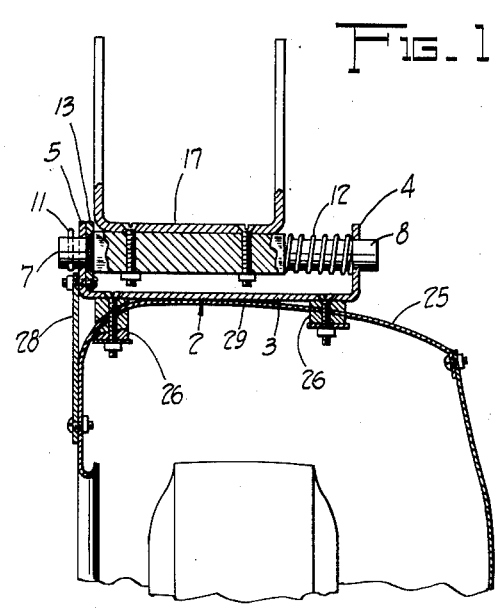
Figure 1 is a sectional view, somewhat fragmentary, illustrating one form of mounting of the carrier bracket unit of this invention.

Referring now to Figures 1 and 6, the carrier bracket unit generally designated 1 is comprised of a main mounting or body member 2, preferably formed of heavy gauge steel into a substantially U-shaped member including a body portion 3 and flanges 4 and 5. A post 6 having a body portion of substantially square formation in cross-section, includes a cylindrical end 7 and an opposite cylindrical portion 8 formed integrally with the body of the post 6. At the lower end of the post, as shown in Figure 6, it will be noted that the square body portion is chamfered as at 9 from the square portion thereof into the cylindrical member or portion 7. A suitable transverse opening 10 is provided in which a cotter pin such as 11 may be inserted when the post is in its normally engaged position in the unit 1.

The upper portion of the post 6 is provided with a shoulder at the end of the square section thereof and a spring 12 is adapted to be emplaced upon the cylindrical portion of the post and abut the shoulder on the post at the end of the square section thereof and against the inner side of the flange 4, as will be apparent. The opening in the flange 4 through which the cylindrical portion 8 of the post 6 is adapted to be inserted, is of a conformation which will permit the post to be positioned as shown in Figure 6 and thereafter the cylindrical end 7 may be inserted within a suitable opening in the flange 5 of the body member 2.

Figure 2:
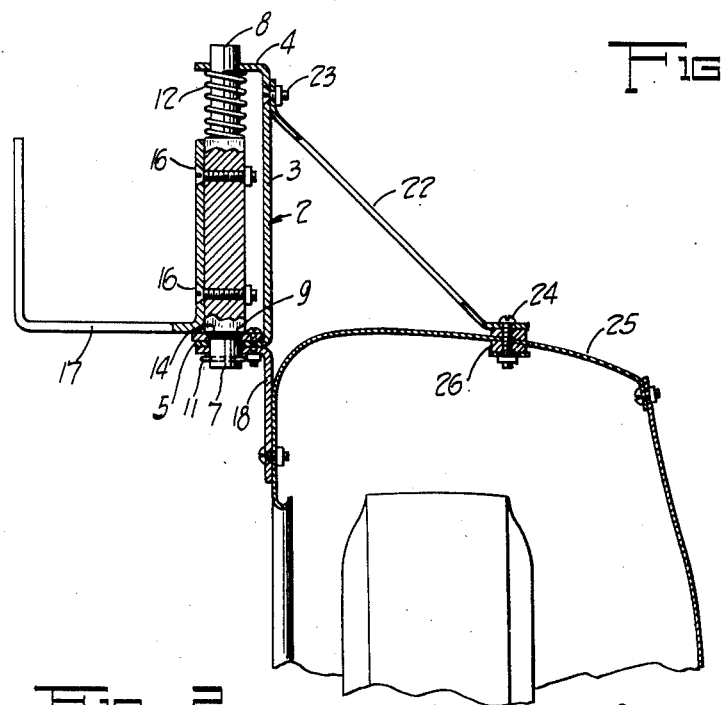
Figure 2 is a view similar to Figure 1, showing

A wear or locking plate 13 is provided and includes a mating chamfered opening 14 therein, adapted to receive the chamfered portion 9 of the post 6, and by reason of the pressure of the spring 12 upon the upper shoulder of the square section of the post 6, the same will be maintained in contact with the chamfered portion 14 for purposes to be hereinafter set forth. Suitable bolt receiving openings 15 are drilled or otherwise formed in the body of the post 6, the same being adapted to receive therein suitable fastening members such as the bolts 16, as shown in Figures 1, 2 and 3, said bolts 16 serving to fasten a material supporting bracket generally designated 17 thereon. The bracket 17 is a substantially U-shaped bracket and is adapted to be positioned by the bolts 16 in either one of the positions shown in Figures 1 or 2 by reason of the appropriate openings formed therein, as will be apparent.

In Figure 4 there is illustrated a carrier bracket unit provided with suitable means for mounting the same on a fender or the like of a truck, as shown in Figure 2. These means comprise an L-shaped supporting bracket 18 provided with suitable openings therein adapted to receive the screws or bolts 19 and additionally furnished with an opening 20 through which the cylindrical portion 7 of the post 6 is received. Suitable bolts or other fastenings 21 are furnished whereby to maintain the L-shaped bracket 18 in position with respect to the flange member 5 of the body member 2, which will be apparent. Of course, the cotter pin 11 is inserted in the opening 10 in the post 6 after assembly of the unit, as shown in Figure 2, the material supporting bracket 17 being mounted as shown in said figure. A suitable brace member 22 is provided and is adapted to be secured adjacent the upper flange 4 of the body member 2 by appropriate fastenings 23, and in turn suitably fastened by means of fastenings such as the bolt and nut 24 to the fender 25, as shown in Figure 2. Round wedge-shaped washers 26a are preferably furnished so as to enable the bolt 24 to be fastened in an aligned relationship on the fender so as to relieve strain therein and accommodate the fastening to the contour of the fender.

In Figure 5 a somewhat different form of fastening means is provided, whereby the unit 1 may be fixed to the side 27 of a panel truck or the like, and in this form the wedge-shaped washers 26a are substantially rectangular and provided with suitable grooves therein to maintain the washers in their proper relationship. It will be apparent that this particular mounting arrangement imparts desired rigidity to the unit as a whole for the purposes of this invention.

In Figure 7 a still different form of mounting arrangemetn is disclosed, including strap members 28, the unit being suitably supported at the top of a fender such as illustrated in Figure 1, the fender being designated 29 therein, the strap members 28 being availed of to prevent distortion of the unit and/or the fenders, providing additional rigidity. Suitable washers such as those designated 26 may be desirably availed of in this form so as to properly seat the unit 1 on the fender.

Having in mind the foregoing description of the various forms of mounting for the carrier bracket unit 1, it will be apparent that the same is readily adaptable to various forms of vehicles, so as to be mounted thereon in the most convenient position, and yet provide for supporting relatively long pieces of material. As shown in the various figures it will be apparent also that the post 6 and supporting bracket 17 may be turned angularly with respect to the mounting or body member 2 so as to assume a position either along side the body of the truck or flat upon the fender thereof, and thus be out of the path of pedestrians or other obstacles, the provision of the wear or locking plate 13 with its chamfered recess 14 therein, in conjunction with the chamfered portion 9 of the post 6, will maintain the post and its associated bracket 17 in various positions for the above purposes. It is of course contemplated that the spring 12 shall be of sufficient strength to prevent the undesired or unnecessary movement of the post from one to the other position and in addition, prevents unnecessary locking means from being resorted to.

Referring now to Figure 8, it will be noted that the same diagrammatically illustrates brackets such as are more specifically illustrated in Figures 3 and 2, as being mounted upon the fender 25 and side panel 27 of the truck, respectively. As shown in this figure the long material such as pipe or the like is being supported by the bracket members 17 for transportation from place to place. It is of course contemplated that the material shall be wired or otherwise secured to the bracket members 17 in accordance with the usual practice, but the novel construction of my invention provides yet another function now to be set forth.

In the event that the operator of the vehicle shown in Figure 8, and designated A, should be forced to stop suddenly, and the pipes 30 are sufficiently heavy, the same will shift forwardly. This forward shift will cause the posts 6 to turn, carrying with them the brackets 17, into the position shown in dotted lines in this figure. This shifting of the material 30 will in effect cause a binding action to be effected by means of the rotation of the brackets 17 and thus prevent the material 30 from moving farther forward. This may be described as the locking action which will be effected and yet the spring members 12 are of sufficient strength so that unless the stopping of the vehicle is so sudden, they will ordinarily not permit the rotation of the posts 6 and bracket members 17 thereon by reason of the action of the chamfered portion 9 and recess 14. It will, of course, be apparent that sudden forward movement of the vehicle will cause an opposite reaction to that described and the same locking effects will result.

In view of the description hereinabove set forth it will be understood that the carrier bracket unit of my invention is so constructed as to permit of its mounting in various positions upon the vehicle and provides the additional functions of being able to be folded out of the way, and further, to provide a locking action to prevent displacement of the material being carried thereby.

Having thus described my invention, what I claim as new and desire to secure by Letters Patent of the United States is:

1. In a bracket unit of the class described in combination, a U-shaped mounting member including a body portion and a pair of flanges having openings therein, a post having a body member formed with cylindrical portions at opposite ends seated in said openings, a spring carried by one of said last named portions and engaging one of said flanges and yieldingly pushing the post toward the other flange, and a locking plate adjacent the other cylindrical portion and interlocking with a portion of the post under the action of said spring, seated on the other of said flanges, a bracket connected to the middle of body member aforesaid, and means for mounting the said unit on a vehicle.

2. A combination as claimed in claim 1 wherein the body member is formed with a chamfered polysided portion at one end for engagement with a co-mating chamfered polysided opening in the said locking plate.

3. The combination as claimed in claim 1 wherein the body member is rectangular, is chamfered at one end at the intersection with the cylindrical portion, and the locking plate is provided with a chamfered opening therein to receive the chamfered end aforesaid.

4. In combination, an automotive vehicle including a truck for carrying long loads such as bars or pipes, means to support said loads comprising a pair of longitudinally alined load carrying units spaced apart forwardly and rearwardly on the vehicle, each unit comprising a material supporting vertical U-shaped bracket disposed transversely on the vehicle, and a post attached for rotation on the vehicle and secured to a portion of its bracket so the latter may move pivotally with the post, under applied force, to positions at an angle to its normal position.

5. The combination of claim 4, combined with yielding means normally coacting with the bracket of each unit to maintain the transverse disposition thereof on the vehicle.

6. The combination of claim 4 in which the post of each unit is vertical and attached to one side of its bracket.

7. The combination of claim 4, in which the post is horizontal and connected to that portion of its bracket connecting the sides thereof.

8. The combination of parts of claim 4, with instrumentalities coacting with the post yieldingly to hold the bracket folded against the vehicle, or in its normal operative position with its sides projecting from the vehicle.

CASEY DI VINCENZO.

References Cited in the file of this patent

UNITED STATES PATENTS

| Number | Name | Date |
|---|---|---|
| 1,551,116 | Pieterick | Aug. 25, 1925 |
| 1,651,969 | Saxton | Dec. 6, 1927 |
| 1,735,098 | Wight | Nov. 12, 1929 |
| 1,816,834 | Eva | Aug. 4, 1931 |
| 1,956,040 | Meyer | Apr. 24, 1934 |
| 2,112,464 | Jacobs | Mar. 29, 1938 |
| 2,233,273 | Di Vincenzo | Feb. 25, 1941 |
| 2,266,220 | Larson | Dec. 16, 1941 |
| 2,425,629 | Mayer | Aug. 12, 1947 |
| 2,512,397 | Trautner | June 20, 1950 |
| 2,542,696 | Nelson | Feb. 20, 1951 |